United States Patent [19]

Anscher

[11] 4,089,248
[45] May 16, 1978

[54] SELF-LOCKING UNITARY MOLDED PLASTIC FASTENER

[75] Inventor: Bernard Anscher, Woodbury, N.Y.

[73] Assignee: National Molding Corporation, Farmingdale, N.Y.

[21] Appl. No.: 742,074

[22] Filed: Nov. 15, 1976

Related U.S. Application Data

[63] Continuation of Ser. No. 579,546, May 21, 1975, abandoned.

[51] Int. Cl.² ............................................. F16B 13/04
[52] U.S. Cl. ........................................................ 85/71
[58] Field of Search .................... 85/70, 71, 73, 74, 72, 85/75, 76, 79

[56] References Cited

U.S. PATENT DOCUMENTS

| | | | |
|---|---|---|---|
| 1,108,656 | 8/1914 | Adler | 85/75 |
| 3,056,852 | 10/1962 | Sachs | 85/73 X |
| 3,074,134 | 1/1963 | Buechler | 85/72 X |
| 3,143,916 | 8/1964 | Rice | 85/71 |
| 3,313,083 | 4/1967 | Flora | 85/70 X |

FOREIGN PATENT DOCUMENTS 44-7768   6/1964   Japan ....................... 85/72

Primary Examiner—Ramon S. Britts

[57] ABSTRACT

A deformable plastic self-locking fastener is disclosed comprising an upper head portion having an internal passage therethrough with a plurality of serrations formed on a portion of the surface of the internal passage. Tie strips are also integrally appended to the lower surface of the upper head portion and enclose at least a part of the serrations on the upper head. The tie strips have a predetermined taper or score line to permit the ties to collapse during operation. A lower member, preferably tubular in form, has an internal passage in axial alignment with the internal passage in the upper head portion and is connected to the upper head portion by the tie strips. Serrations, complementary to, and in axial alignment with the serrations in the upper head portion, are formed on the exterior of the lower member so that when a screw is inserted into the fastener and advanced therein, the lower member is drawn towards said upper head portion by the collapsing and folding of the tie strips with the fastener self-locking by the two groups of serrations interlocking.

4 Claims, 6 Drawing Figures

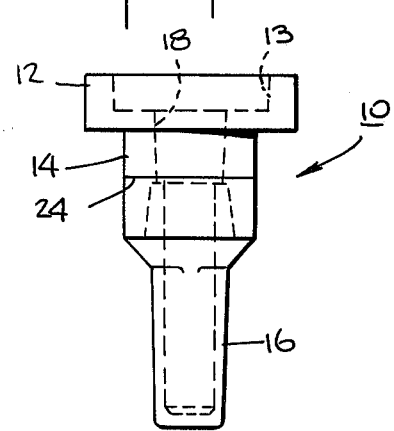
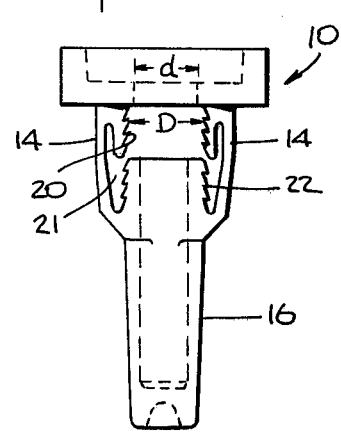
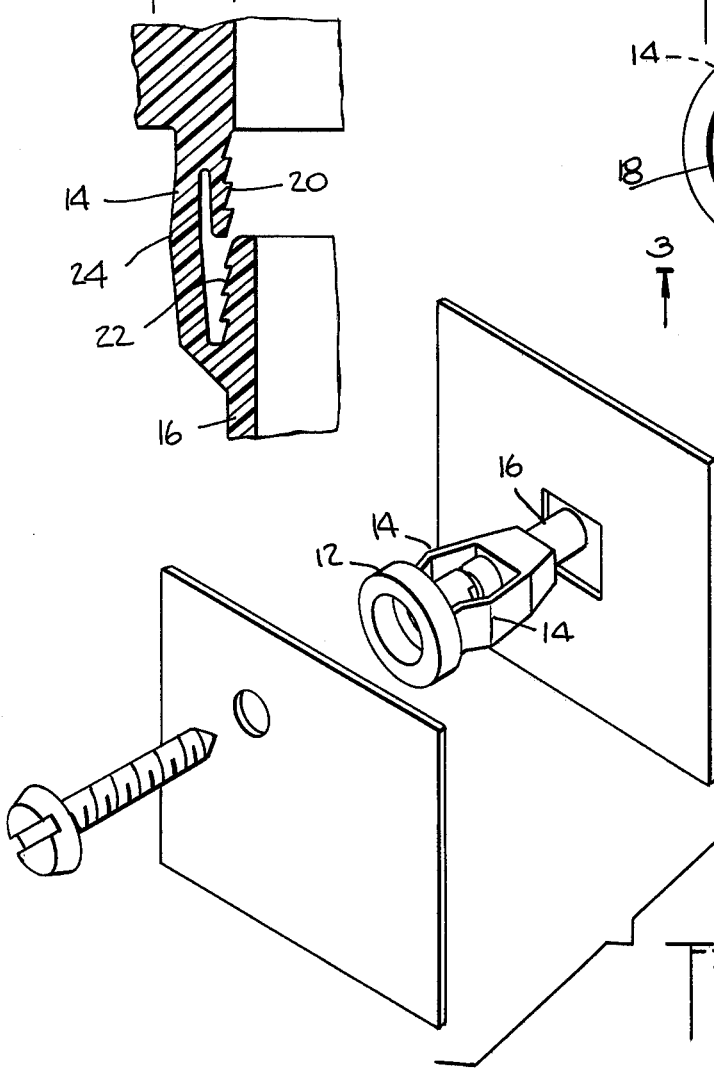
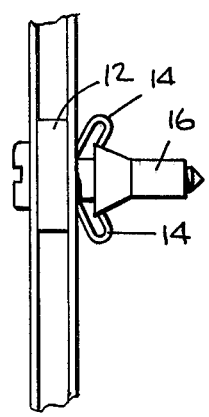

SELF-LOCKING UNITARY MOLDED PLASTIC FASTENER

This is a continuation, of application Ser. No. 579,546, filed May 21, 1975, now abandoned.

BACKGROUND OF THE INVENTION

This invention relates to a fastening means; more particularly the invention relates to a unitary, molded, self-locking plastic fastener.

Various fastening means are known for joining two workpieces together or for anchoring a screw or bolt to a workpiece. For example, U.S. Pat. Nos. 2,887,926; 3,143,916; 3,313,083; and 3,601,869 all describe collapsible plastic fasteners adapted to receive a self-threading screw and fold on to itself with the exterior perimeter expanding when the self-threading screw is advanced through the fastener. Other plastic fasteners are designed to axially collapse on to themselves. For example, U.S. Pat. No. 3,443,473 shows a hollow rivet fastener for use between opposing skins of a sandwich construction. The fastener of this patent axially collapses between the two layers of the sandwich to provide strengthened columnar support on the unsupported portions of the sandwich faces.

Other fasteners such as toggle bolts or anchors are known in which the advancement of a self-threading screw or an anchor bolt into the anchor expands the anchor and forces the anchor into the surrounding medium. For example, as shown in U.S. Pat. Nos. 3,472,111 and 3,735,665 expandable anchor bolts are shown in which the advancement of a bolt or screw into the anchor causes an expansion of the anchor into the surrounding medium and the resulting locking of the anchor into the medium.

Other fastening devices are shown in U.S. Pat. Nos. 3,270,793; 3,521,521; and 3,683,740.

Each of these various anchors and fasteners while useful for different functions operate by expanding a portion of the fastener to grip the substance in which the fastener is inserted or to expand behind the object to which the fastener is inserted and thereby lock the fastener in place. In the operation of the prior art fasteners, however, once the screw or bolt is backed out of the fastener the fastener may no longer hold. This occurs because the fasteners lack any internal self-locking means to retain the fastener in its expanded operable position. Thus, for example, in a unitary axially expanding fastener, shown in U.S. Pat. No. 3,313,083, once the self-tapping screw is backed out of the plastic fastener, there is no means within the fastener to lock it in its expanded position and to prevent it from assuming its former condition.

Accordingly it is an object of this invention to provide a unitary, deformable plastic fastener which once inserted into a body and expanded into its operative, fastening mode will retain its holding capacity after the screw or other threaded member is withdrawn from the fastener.

A still further object of the present invention is to form the fastener from deformable, unitary molded plastic or nylon material.

Another object of the present invention is to provide a plurality of fasteners which may be locked in place by a single screw, which is inserted into and then removed from each fastener after the fastener is locked in place.

SUMMARY OF THE INVENTION

To accomplish the objects of this invention, a collapsible unitary fastener, formed from plastic, nylon or other moldable resilient material, comprises an upper head portion having an interior opening with serrated locking teeth formed on the interior walls of the opening. Tie strips are connected on one end to the upper head. The tie strips then extend down from the upper head and connect to a lower tubular member. The tie strips are pre-weakened by tapering, scoring or other means to form a predetermined fold line. The lower tubular member is formed to enclose any screw, bolt or other threaded means inserted into the fastener through the upper head portion. Serrations are also formed on the outer periphery of the lower tubular member in the upper portion thereof adjacent the upper head portion. The serrations on the lower tubular member are shaped complementarily to the serrations on the interior of the upper head portion so that they may readily slide together as the tie strips fold and the outer circumference of the fastener expands. Because the serrations are complementary to each other, after sliding together they resist any attempt to subsequently draw the two members apart from each other after the expansion of the tie strips. For example, the collapsible fastener may be operated by inserting the fastener within an opening in the objects to be secured together or to which an object is to be fastened. A self-tapping screw may then be inserted through the upper body portion of the fastener and advanced into the lower tubular member. As the screw is tightened it advances into, and draws up the lower tubular member. The drawing up of the lower tubular member causes the tie strip to collapse along the predetermined fold lines and thereby bulge out the tie strips. As the tie strips bulge out the serrations on the lower member are slid past the serrations on the upper head with the two groups of serrations meshing together thereby locking the upper head and the lower tubular members together.

BRIEF DESCRIPTION OF THE DRAWINGS

The invention, as well as its objects and features will be better understood by reference to the following detailed description of the preferred embodiment of this invention taken in conjunction with the accompanying drawings in which:

FIG. 1 is a side plan view of a fastener or anchor including features of the present invention;

FIG. 2 is a top plan view of the fastener or anchor shown in FIG. 1;

FIG. 3 is a second side plan view of the fastener taken along lines 3—3 of FIG. 2;

FIG. 4 is an enlarged, partial cross-sectional view illustrating in detail the area surrounding the serrations;

FIG. 5 is an exploded view illustrating the fastener of this invention in position between two plates prior to the insertion of a screw; and FIG. 6 is a side plan view illustrating the fastener in its operative position after a screw has been inserted into the fastener and the lower tubular member has been drawn up onto the upper head portions.

DESCRIPTION OF THE PREFERRED EMBODIMENTS

In the drawings identical parts are designated by the same number. The fastener or anchor device 10 is a unitary member molded from a substantially resilient material such as plastic, nylon, polypropylene, high impact polystyrene or other similar material. The unitary fastener comprises an upper head portion 12, which optionally may have an appropriate recess 13 for receiving the head of any screw or threaded member inserted into the fastener. Tie strips 14 as shown in FIG. 3 are appended on one end to a lower surface of the upper head portion 12. The other end of the tie strips is connected to a lower tubular member 16. The overall length of the fastener 10, including the upper head portion 12 and the lower tubular member 16, is selected to permit the insertion of an appropriate screw or threaded member within the fastener and advancing the screw into the fastener until the fastener is drawn into its self-locking mode.

As shown in FIGS. 1–3 an interior tubular passage 18 is formed within the fastener 10 and passes completely through the fastener from the recess 13 in the upper head portion 12 through the tie strip portion 14 and into the lower tubular member 16. As shown in these FIGS. the interior tubular passage 18 in the upper head portion 12 has a plurality of serrations or saw-teeth projections 20 molded into the wall of the member. As shown in FIGS. 1, 2, and 3 the tubular passage in the upper head portion is larger than the tubular passage in the lower member 16. The diameter D of the interior tubular passage 18 between the serrations in the upper portion of the fastener 10 exceeds the diameter of the screw passage d in the upper portion of the fastener. Thus the serrations 20 will not be damaged by the screw as it is advanced through the fastener 10. On the exterior of the lower tubular member 16 in the cavity area 21 between the upper portion 12 and lower tubular member 16, complementary serrations or saw-teeth projections 22 are disposed around the perimeter of the member 16.

Tie strips 14 as shown in FIGS. 3 and 4 are connected on one end to the lower surface of the head portion 12 and enclose the upper portion of the interior tubular passage 18. The other end of the tie strips 14 are connected to the outer periphery of the lower tubular member 16. Further as shown in FIGS. 3 and 4 the tie strips 14 are molded with a taper bias or score line 24 along the surface of the tie strips permitting the folding of the tie strips 14 along this line as the fastener is self-locked and secured.

FIG. 5 illustrates the operation of the fastener. As shown in the exploded view in FIG. 5 a screw is inserted into fastener 10, passes through the upper tubular passage 18 and advances into the lower tubular member 16 through passage 18. The screw which may be a self-tapping screw or other threaded member threads itself into the lower tubular member 16. Because of the threads on the screw and the taper at 24 on tie strips 20, as the screw advances into member 16 and lower tubular member 16 is slowly drawn up towards the upper member 14. As the lower member 16 is drawn up and as the tie strips 14 expand outwardly because of the taper, bias or score line, the upper and lower serrations 20 and 22 are drawn together with the lower serrations 20 slipping easily over the upper serrations 22. Once the lower serrations 20 are advanced up onto the upper serrations 22, however, because of the complementary form of the serrations the upper and lower portions of the fastener are interlocked preventing the lower member 16 from separating from the upper member 14 after the screw is removed from the fastener 10. Thus the fastener can be mounted within an object or between two flat plates as shown in FIGS. 5 and 6. A screw is then advanced into the fastener to thereby draw the lower portion of the fastener up onto the upper portion as shown in FIG. 6. This fastens the two members together by advancing the lower serrated member onto the upper serrated member. Because of the interlocking of the upper and lower serrations the two members remain interlocked after the screw is removed from the fastener.

Thus by this invention a unitary molded self-locking fastener may be formed for use in a multiplicity of applications. For example, as a self-locking toggle or as a fastener for holding two or more objects together. Further while illustrated herein in a tubular construction it is within the contemplation of my invention that it may be molded in any geometric form desired such as a square, rectangle or other shape appropriate for the fastening situation. Similarly it may be used to mount one object on another object or to carry out any fastening need which employs a deformable resilient fastener. It is to be further understood that the embodiment of this invention described herein is merely intended to illustrate the operative principles of the invention and is not to be considered as limiting the scope of the invention. Modifications may be made by those skilled in the art without departing from the spirit of the invention.

I claim:

1. A one-piece deformable plastic fastener which includes:
    (a) an upper body portion having an axially extending internal bore therethrough;
    (b) a lower portion having an internal bore therein in axial alignment with said internal bore through said upper body portion;
    (c) the bore through said lower portion being narrower than the bore through said upper body portion, said bore adapted for self-threading co-action with a threaded member to be inserted through the bore of said upper body portion and threaded into the bore of said lower portion;
    (d) a pair of opposed tie strips joining said upper body portion and said lower portion, said tie strips having a taper formed therein, said fastener adapted for insertion through an opening in a supporting member such that said upper body portion will be disposed adjacent one side of said supporting member and whereby a threaded member may be inserted and threaded into the bore in said lower portion to draw it toward said upper body portion thereby causing axial collapsing deformation of said tie strips and outward movement of a portion thereof to bring said tie strips into engagement with the other side of said supporting member as said threaded member is turned into the bore of said lower member;
    (e) said lower member having a first circumferentially continuous cylindrical axial extension extending axially upward above the point of attachment with said tie strips and internal of said tie strips;
    (f) said upper body portion having a second circumferentially continuous cylindrical axial extension extending downward in a direction toward said lower portion from the point of attachment of said tie strips thereto, the internal diameter of said second axial extension being approximately equal to the outside diameter of said first axial extension;
    (g) a plurality of axially spaced serrations on the inside of said second axial extension or the outside of said first axial extension; and (h) at least one projection in axial alignment with said plurality of serrations on the other of said extensions for engaging said serrations, said fastener being made of a resilient material whereby, when said tie strips are collapsed against the other side of said supporting member, said at least one projection will resiliently engage one of said serrations, the axially spaced serrations permitting a locking engagement for differing thicknesses of the supporting member to maintain said tie strips collapsed and in abutment with said supporting member even if said threaded member is later withdrawn.

2. The improvement according to claim 1 wherein serrations are formed on two opposing sides of one said extending portions and said at least one projection on opposing sides of the other of said portions in axial alignment with said serrations.

3. The fastener according to claim 1 wherein said upper body portion comprises an annular head member having a recess therein for receiving a screw head.

4. The fastener according to claim 3 wherein said plurality of serrations are on said downward axial extension and said at least one projection on said upward axial extension.

* * * * *